United States Patent
Kim

(10) Patent No.: US 9,569,034 B2
(45) Date of Patent: Feb. 14, 2017

(54) DISPLAY DEVICE

(71) Applicant: LG Display Co., Ltd., Seoul (KR)

(72) Inventor: Sungchul Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/953,887

(22) Filed: Nov. 30, 2015

(65) Prior Publication Data

US 2016/0085377 A1    Mar. 24, 2016

Related U.S. Application Data

(63) Continuation of application No. 13/719,891, filed on Dec. 19, 2012.

(30) Foreign Application Priority Data

May 21, 2012    (KR) .................. 10-2012-0053647

(51) Int. Cl.
*G06F 3/044* (2006.01)
*G06F 3/041* (2006.01)

(52) U.S. Cl.
CPC ............ *G06F 3/0418* (2013.01); *G06F 3/044* (2013.01); *G06F 3/0412* (2013.01)

(58) Field of Classification Search
CPC ...... G06F 3/0412; G06F 3/0418; G06F 3/044; G09G 2300/0426; G09G 3/2092; G09G 3/3677
See application file for complete search history.

(56) References Cited

U.S. PATENT DOCUMENTS

| 2006/0145999 | A1* | 7/2006 | Cho ............... G11C 19/00 345/100 |
| 2010/0002827 | A1* | 1/2010 | Shih ............... G09G 3/3677 377/57 |
| 2010/0238122 | A1 | 9/2010 | Chang et al. |
| 2012/0038585 | A1* | 2/2012 | Kim ............... G06F 3/0412 345/174 |

FOREIGN PATENT DOCUMENTS

TW    201035826 A1    10/2010

OTHER PUBLICATIONS

Taiwan Patent Office, Office Action, Taiwanese Patent Application No. 101149208, Nov. 7, 2014, seven pages.

(Continued)

*Primary Examiner* — Nichoals Lee
*Assistant Examiner* — Richard Hong
(74) *Attorney, Agent, or Firm* — Fenwick & West LLP

(57) ABSTRACT

A display device includes a display panel including data lines, gate lines crossing the data lines, and pixels arranged in a matrix form, a touch screen which is embedded in the display panel or is installed on the display panel, a data driving circuit supplying a data voltage to the data lines, a gate driving circuit supplying a gate pulse to the gate lines, and a touch sensing circuit which supplies a driving signal to lines of the touch screen and senses a touch input. The gate driving circuit alternately drives pull-down transistors connected in parallel to one gate line. The gate driving circuit drives one of the pull-down transistors or simultaneously drives the pull-down transistors during a drive period of the touch screen.

13 Claims, 12 Drawing Sheets

(56) References Cited

OTHER PUBLICATIONS

United States Advisory Action, U.S. Appl. No. 13/719,891, Aug. 7, 2015, 4 pages.
United States Office Action, U.S. Appl. No. 13/719,891, Apr. 21, 2015, 14 pages.
United States Office Action, U.S. Appl. No. 13/719,891, Sep. 11, 2014, 11 pages.

* cited by examiner

US 9,569,034 B2

DISPLAY DEVICE

This application is a continuation application of U.S. patent application Ser. No. 13/719,891, filed on Dec. 19, 2012, which claims the benefit of Korean Patent Application No. 10-2012-0053647, filed on May 21, 2012, the entire contents of both of which are incorporated herein by reference for all purposes as if fully set forth herein.

BACKGROUND OF THE INVENTION

1. Field of the Invention

Embodiments of the invention relate to a display device including a touch screen.

2. Discussion of the Related Art

User interfaces (UI) are configured so that users are able to communicate with various electronic devices and thus can easily and comfortably control the electronic devices as they desire. Examples of a user interface include a keypad, a keyboard, a mouse, an on-screen display (OSD), and a remote controller having an infrared communication function or a radio frequency (RF) communication function. User interface technologies have continuously evolved to increase user's sensibility and handling convenience. The user interface has been recently developed to touch UI, voice recognition UI, 3D (three-dimensional) UI, etc., and the touch UI has been basically installed in portable information devices. A touch screen is installed on a display panel of household appliances or the portable information devices, so as to implement the touch UI.

A capacitive touch screen has greater durability and definition than conventional resistive touch screens and is able to carry out multi-touch recognition and proximity-touch recognition. Hence, the capacitive touch screen may be applied to various applications. Because the capacitive touch screen is attached to a display panel or is embedded in the display panel, the capacitive touch screen is electrically coupled with the display panel. A noise that is added to a capacitive voltage of the capacitive touch screen changes when a driving signal of the display panel or a parasitic capacitance of the display panel changes. The noise reduces sensing sensitivity of the capacitive touch screen.

SUMMARY OF THE INVENTION

Embodiments of the invention provide a display device capable of reducing a noise of a touch screen.

In one aspect, a display device comprises a display panel including data lines, gate lines crossing the data lines, and pixels arranged in a matrix form, a touch screen which is embedded in the display panel or is installed on the display panel, a data driving circuit configured to supply a data voltage to the data lines, a gate driving circuit configured to supply a gate pulse to the gate lines, and a touch sensing circuit configured to supply a driving signal to lines of the touch screen and sense a touch input.

The gate driving circuit alternately drives pull-down transistors connected in parallel to one gate line. The gate driving circuit drives one of the pull-down transistors or simultaneously drives the pull-down transistors during a drive period of the touch screen.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

A display device according to an example embodiment of the invention may be implemented based on a flat panel display, such as a liquid crystal display (LCD), a field emission display (FED), a plasma display panel (PDP), an organic light emitting diode (OLED) display, and an electrophoresis display (EPD). In the following description, the embodiment of the invention will be described using the liquid crystal display as an example of the flat panel display. Other flat panel displays may be used.

Figure 1:
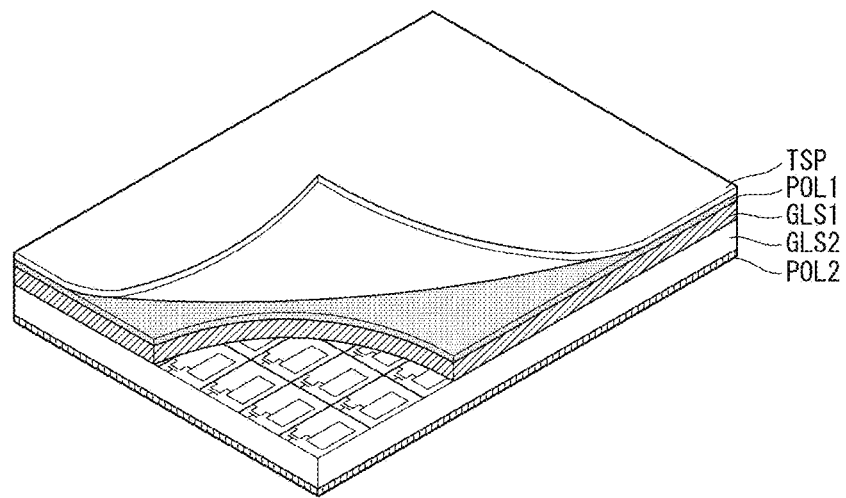
FIGS. 1 to 3 illustrate various combinations of a touch screen and a display panel according to an example embodiment of the invention.
Figure 2:
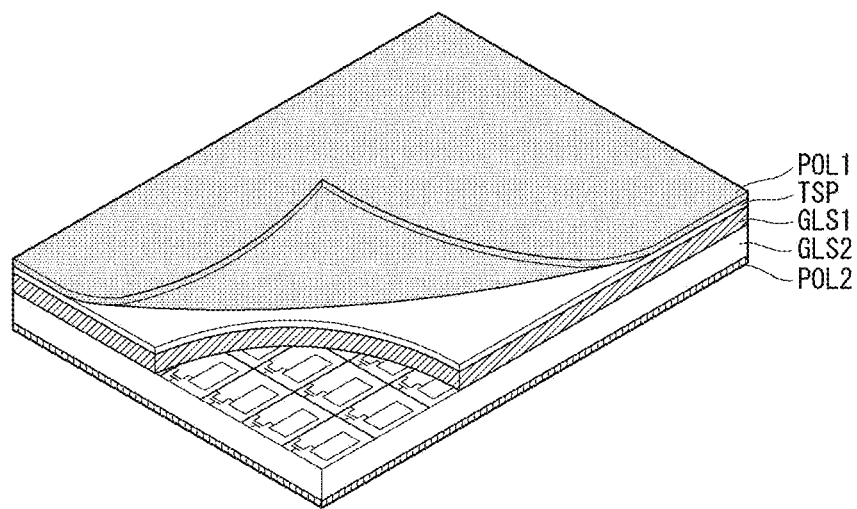
Figure 3:
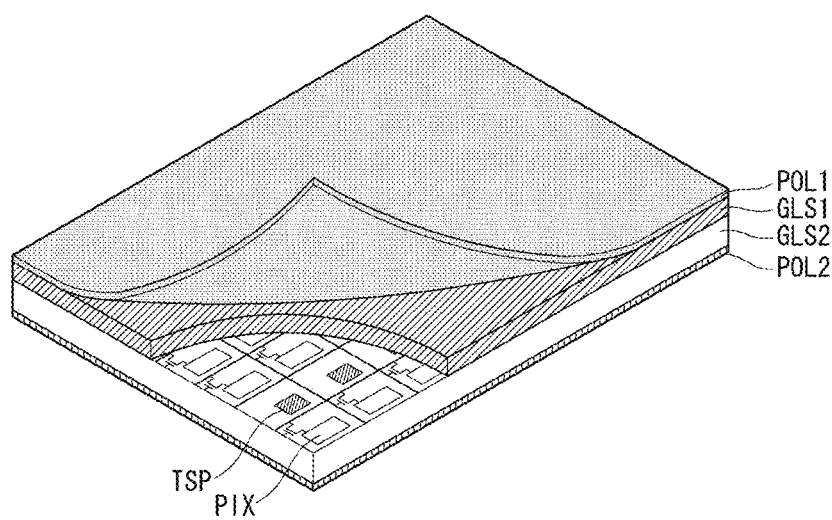

A touch screen TSP may be installed in a display panel according to the embodiment of the invention using methods shown in FIGS. 1 to 3. As shown in FIG. 1, the touch screen TSP may be attached on an upper polarizing film POL1 of the display panel. Alternatively, as shown in FIG. 2, the touch screen TSP may be formed between the upper polarizing film POL1 and an upper substrate GLS1. Alternatively, as shown in FIG. 3, capacitive touch sensors of the touch screen TSP may be embedded in a pixel array of the display panel. In FIGS. 1 to 3, 'PIX' denotes a pixel electrode of a pixel, 'GLST' denotes a lower substrate, and 'POL2' denotes a lower polarizing film.

The touch screen TSP may be implemented as a capacitive touch screen. The capacitive touch screen is divided into a self-capacitive touch screen and a mutual capacitive touch screen. The self-capacitive touch screen is formed along conductor lines of a single-layered structure formed in one direction. The mutual capacitive touch screen is formed between two conductor lines which are orthogonal to each other.

Figure 4:
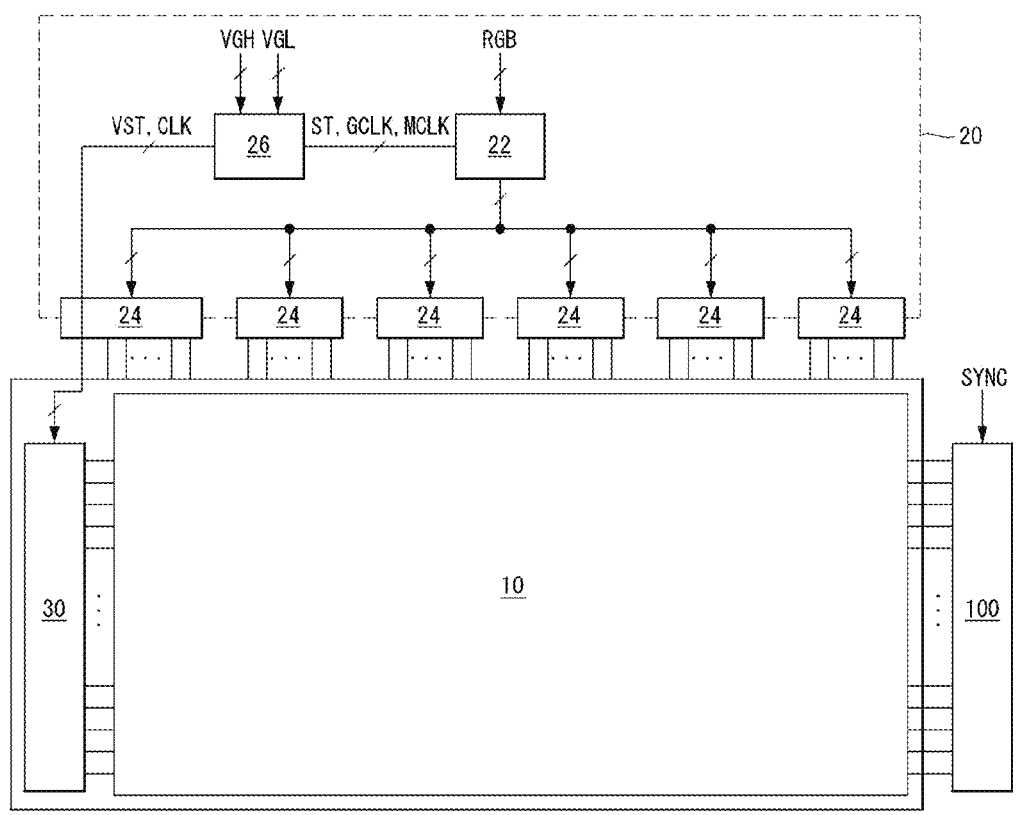
FIG. 4 is a block diagram of a display device according to an example embodiment of the invention.
Figure 5:
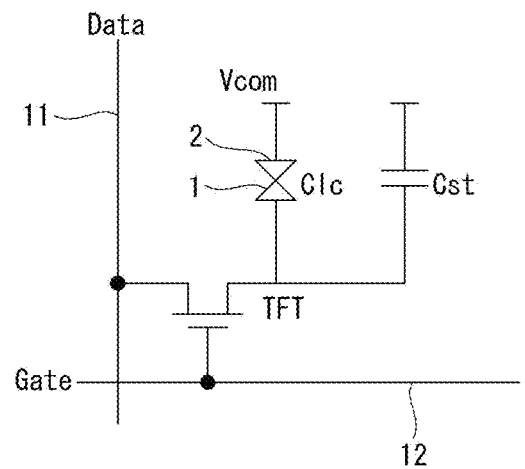
FIG. 5 is an equivalent circuit diagram of a liquid crystal cell.

As shown in FIGS. 4 and 5, the display device according to the embodiment of the invention includes a display panel 10, a display panel driving circuit, a timing controller 22, a touch sensing circuit 100, etc. All components of the display device are operatively coupled and configured.

The display panel 10 includes a lower substrate, an upper substrate, and a liquid crystal layer formed between the lower substrate and the upper substrate. The upper and lower substrates may be manufactured using glass, plastic, film, etc. A pixel array formed on the lower substrate of the display panel 10 includes a plurality of data lines 11, a plurality of gate lines (or scan lines) 12 orthogonal to the data lines 11, and a plurality of pixels arranged in a matrix form. The pixel array further includes a plurality of thin film transistors (TFTs) formed at crossings of the data lines 11 and the gate lines 12, a plurality of pixel electrodes 1 for charging the pixels to a data voltage, a plurality of storage capacitors Cst, each of which is connected to the pixel electrode 1 and holds a voltage of the pixel, etc.

The pixels of the display panel 10 are arranged in a matrix form defined by the data lines 11 and the gate lines 12. A liquid crystal cell of each pixel is driven by an electric field generated depending on a voltage difference between the data voltage supplied to the pixel electrode 1 and a common voltage supplied to a common electrode 2, thereby adjusting an amount of incident light transmitted by the liquid crystal cell. Each of the TFTs is turned on in response to a gate pulse (or a scan pulse) from the gate line 11, thereby supplying the data voltage from the data line 11 to the pixel electrode 1 of the liquid crystal cell. The common electrode 2 may be formed on the lower substrate or the upper substrate of the display panel 10.

The upper substrate of the display panel 10 may include black matrixes, color filters, etc. Polarizing films are respectively attached to the upper and lower substrates of the display panel 10. Alignment layers for setting a pre-tilt angle of liquid crystals are respectively formed on the inner surfaces contacting the liquid crystals in the upper and lower substrates of the display panel 10. A column spacer may be formed between the upper and lower substrates of the display panel 10 to keep a cell gap of the liquid crystal cells constant.

The display panel 10 may be implemented in any known mode including a twisted nematic (TN) mode, a vertical alignment (VA) mode, an in-plane switching (IPS) mode, a fringe field switching (FFS) mode, etc. A backlight unit (not shown) may be disposed in a back space of the display panel 10. The backlight unit may be configured as either an edge type backlight unit or a direct type backlight unit to provide light to the display panel 10.

The display panel driving circuit writes data of an input image to the pixels of the display panel 10 using a data driving circuit 24 and gate driving circuits 26 and 30.

The data driving circuit 24 converts digital video data RGB received from the timing controller 22 into positive and negative analog gamma compensation voltages to generate the data voltage. The data driving circuit 24 then supplies the data voltage to the data lines 11 and inverts a polarity of the data voltage under the control of the timing controller 22.

The gate driving circuits 26 and 30 sequentially supply the gate pulse synchronized with the data voltage to the gate lines 12 and select lines of the display panel 10 to which the data voltage will be applied. The gate driving circuits 26 and 30 include a level shifter 26 and a shift register 30. The shift register 30 may be directly formed on the substrate of the display panel 10 with the development of a gate in panel (GIP) process technology.

The level shifter 26 may be formed on a printed circuit board (PCB) 20 electrically connected to the lower substrate of the display panel 10. The level shifter 26 outputs a start pulse VST and clock signals CLK, which swing between a gate high voltage VGH and a gate low voltage VGL, under the control of the timing controller 22. The gate high voltage VGH is set to be equal to or greater than a threshold voltage of the TFT included in the pixel array of the display panel 10. The gate low voltage VGL is set to be less than the threshold voltage of the TFT. The level shifter 26 outputs the start pulse VST and the clock signals CLK, which swing between the gate high voltage VGH and the gate low voltage VGL, in response to a start pulse ST, a first clock GCLK, and a second clock MCLK which are received from the timing controller 22. Phases of the clock signals CLK output from the level shifter 26 are sequentially shifted and are transmitted to the shift register 30 of the display panel 10.

The shift register 30 is formed at an edge of the lower substrate of the display panel 10, on which the pixel array is formed, so that it is connected to the gate lines 12 of the pixel array. The shift register 30 includes a plurality of cascade-connected stages. The shift register 30 starts to operate in response to the start pulse VST received from the level shifter 26 and shifts its output in response to the clock signals CLK received from the level shifter 26. The shift register 30 sequentially supplies the gate pulse to the gate lines 12 of the display panel 10.

Pull-up transistors are connected to each other between pull-up output terminals of the shift register 30 and the gate lines 12. The pull-up transistors supply the gate high voltage VGH to the gate lines 12 in response to a voltage of a gate terminal connected to the pull-up output terminal of the shift register 30. Pull-down transistors are connected in parallel to each other between pull-down output terminals of the shift register 30 and the gate lines 12. The pull-down transistors supply the gate low voltage VGL to the gate lines 12 in response to a voltage of a gate terminal connected to the pull-down output terminal of the shift register 30. The shift register 30 alternately drives the pull-down transistors connected in parallel to one gate line 12, so as to compensate for a gate bias stress of the transistors during a drive period of the display panel 10. The shift register 30 drives the pull-down transistors using a method, in which characteristics of the pull-down transistors are not changed, so as to prevent an increase in a noise resulting from changes in capacitance of the touch screen TSP during a drive period of the touch screen TSP. For this, as shown in FIG. 14 and FIGS. 16 to 19, the shift register 30 drives only one of the pull-down transistors or simultaneously drives the pull-down transistors during a drive period T2 of the touch screen TSP.

The timing controller 22 supplies the digital video data RGB received from an external host system to integrated circuits (ICs) of the data driving circuit 24. The timing controller 22 receives timing signals, such as a vertical sync signal Vsync, a horizontal sync signal Hsync, a data enable DE, and a clock, from the host system and generates timing control signals for controlling operation timings of the data driving circuit 24 and the gate driving circuits 26 and 30. The timing controller 22 or the host system generates a sync signal SYNC for controlling operation timings of the display panel driving circuit and the touch sensing circuit 100.

The touch sensing circuit 100 applies a driving signal to lines of the touch screen TSP and counts changes in voltage of the driving signal before and after a touch operation or a delay time of a rising or falling edge of the driving signal, thereby sensing changes in the capacitance of the touch screen TSP. The touch sensing circuit 100 converts sensing data obtained from the capacitance of the touch screen TSP into digital data to output touch raw data. The touch sensing circuit 100 performs a previously determined touch recognition algorithm and analyzes the touch raw data to detect a touch (or proximity) input.

Figure 6:
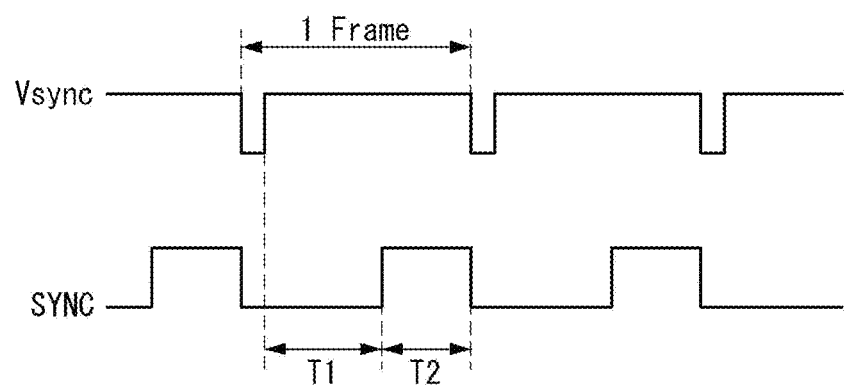
FIG. 6 is a waveform diagram of a vertical sync signal showing a time-division driving method of a display panel and a touch screen.

The display panel 10 and the touch screen TSP may be time-division driven using a method illustrated in FIG. 6. As shown in FIG. 6, one frame period may be time-divided into a display panel drive period T1 and a touch screen drive period T2.

In FIG. 6, 'Vsync' is a first vertical sync signal input to the timing controller 22, and 'SYNC' is a second vertical sync signal input to the touch sensing circuit 100. The timing controller 22 may modulate the first vertical sync signal Vsync received from the host system and generate the second vertical sync signal SYNC, so as to define the display panel drive period T1 and the touch screen drive period T2 in one frame period. In another embodiment, the host system may generate the second vertical sync signal SYNC shown in FIG. 6, and the timing controller 22 may control the display panel drive period T1 and the touch screen drive period T2 in response to the second vertical sync signal SYNC received from the host system. Thus, in the embodiment of the invention, a controller, which time-divides one frame period into the display panel drive period T1 and the touch screen drive period T2 and controls the operation timings of the display panel driving circuit and the touch sensing circuit 100, may be one of the timing controller 22 and the host system.

A low logic level period of the second vertical sync signal SYNC may be defined as the display panel drive period T1, and a high logic level period of the second vertical sync signal SYNC may be defined as the touch screen drive period T2. However, the embodiment of the invention is not limited thereto. For example, the high logic level period of the second vertical sync signal SYNC may be defined as the display panel drive period T1, and the low logic level period of the second vertical sync signal SYNC may be defined as the touch screen drive period T2.

During the display panel drive period T1, the display panel driving circuit is driven, and the touch sensing circuit 100 is not driven. More specifically, during the display panel drive period T1, the data driving circuit 24 supplies the data voltage to the data lines 11 under the control of the timing controller 22, and the gate driving circuits 26 and 30 sequentially supply the gate pulse synchronized with the data voltage to the gate lines 12 under the control of the timing controller 22. Further, the touch sensing circuit 100 does not supply the driving signal to the lines of the touch screen TSP during the display panel drive period T1.

During the touch screen drive period T2, the display panel driving circuit is not driven, and the touch sensing circuit 100 is driven. Thus, during the touch screen drive period T2, the touch sensing circuit 100 supplies the driving signal to the lines of the touch screen TSP and senses a touch (or proximity) input position.

The touch screen TSP shown in FIG. 3, in which capacitances are embedded in the display panel 10 in an in-cell type, is more sensitively affected by changes in a parasitic capacitance of the display panel 10 than the touch screen TSP shown in FIGS. 1 and 2. A line structure and a driving method of an in-cell type touch screen are described below.

Figure 7:
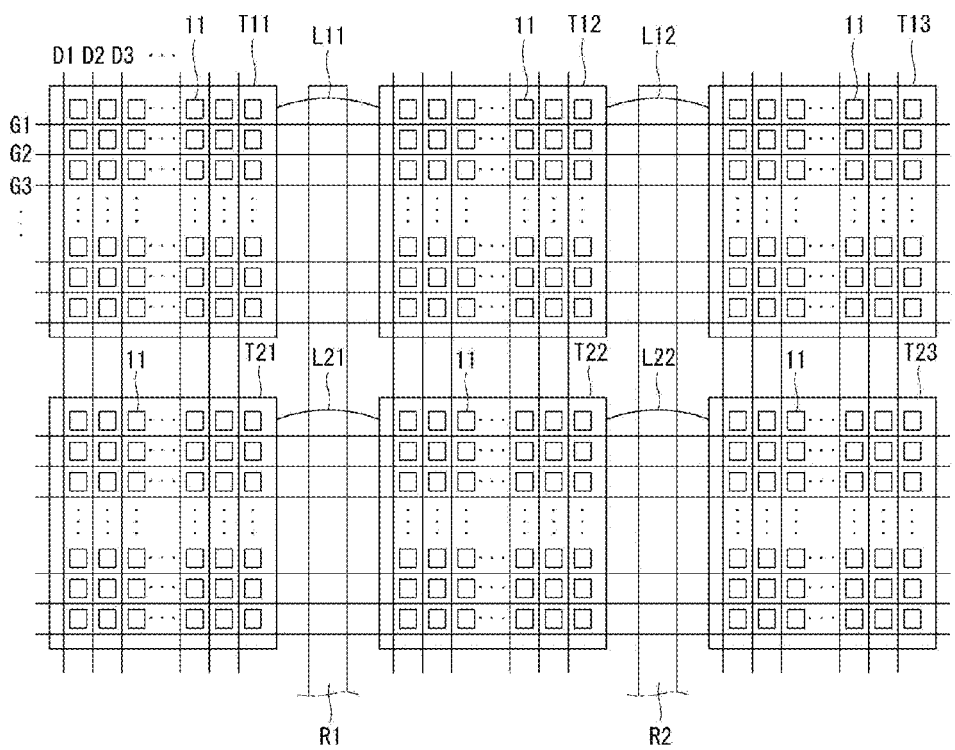
FIG. 7 is a plane view showing a line structure of a mutual capacitive touch screen which is embedded in a display panel in an in-cell type.
Figure 8:
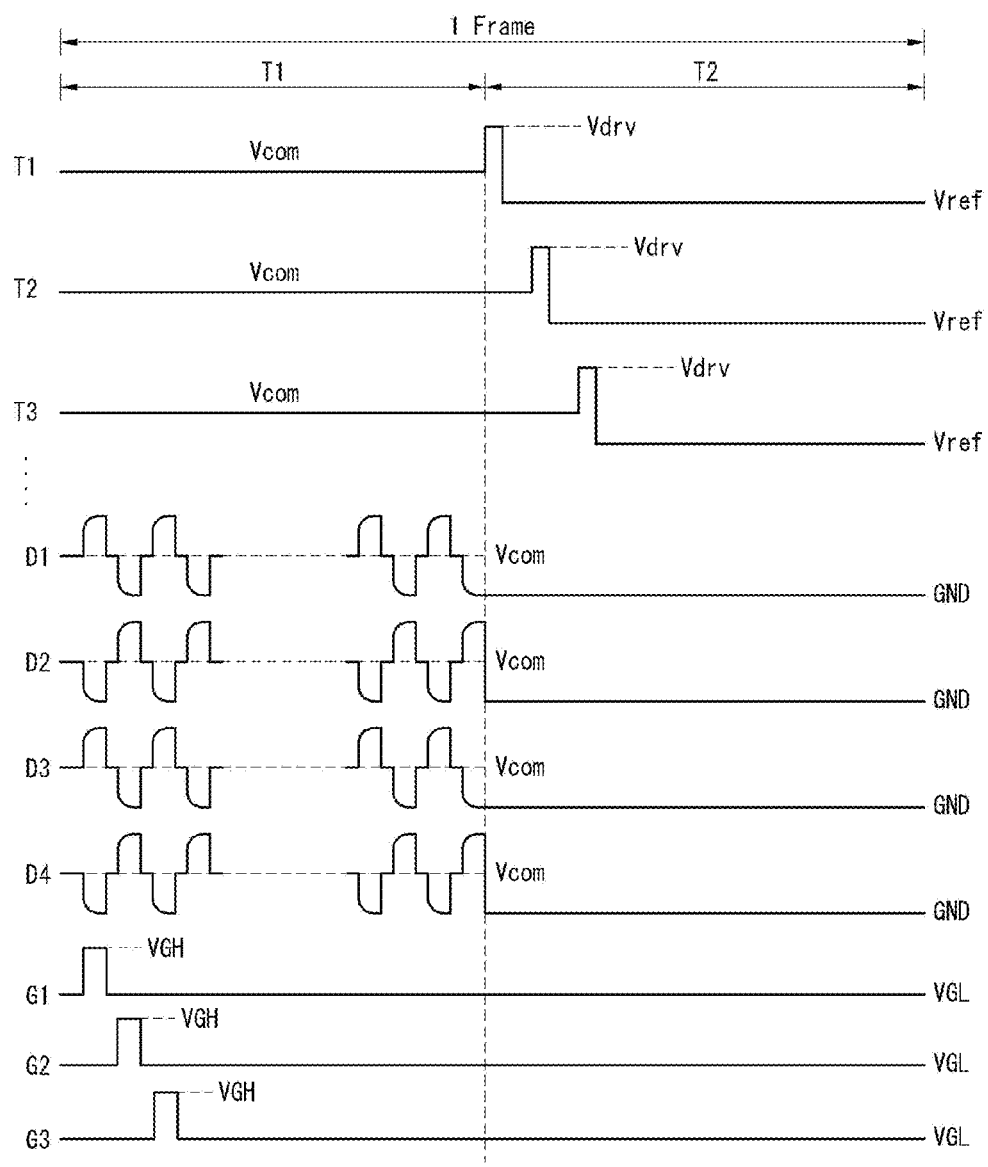
FIG. 8 is a waveform diagram showing an operation of a display device, in which the mutual capacitive touch screen shown in FIG. 7 is embedded.

FIGS. 7 and 8 illustrate a line structure and a driving method of a mutual capacitive touch screen. More specifically, FIG. 7 is a plane view showing a line structure of the mutual capacitive touch screen by enlarging the mutual capacitive touch screen, which is embedded in the display panel in the in-cell type, and a portion of the display panel. FIG. 8 is a waveform diagram showing an operation of the display device, in which the mutual capacitive touch screen shown in FIG. 7 is embedded.

As shown in FIGS. 7 and 8, the mutual capacitive touch screen TSP includes Tx lines and Rx lines R1 and R2 orthogonal to the Tx lines.

Each of the Tx lines includes a plurality of transparent conductive patterns which are connected to each other along a transverse direction (or a horizontal direction) of the display panel 10 through link patterns L11 to L22. A first Tx line includes a plurality of transparent conductive patterns T11 to T13 which are connected to each other along the transverse direction of the display panel 10 through the link patterns L11 and L12. A second Tx line includes a plurality of transparent conductive patterns T21 to T23 which are connected to each other along the transverse direction through the link patterns L21 and L22. Each of the transparent conductive patterns T11 to T23 is patterned so that its size is greater than the size of the pixels, and thus overlaps the plurality of pixels. Each of the transparent conductive patterns T11 to T23 overlaps the pixel electrodes with an insulating layer interposed therebetween, and may be formed of a transparent conductive material, for example, indium tin oxide (ITO). Other materials may be used. The link patterns L11 to L22 electrically connect the transparent conductive patterns T11 to T23, which are adjacent to each other in the transverse direction, to one another across the Rx lines R1 and R2. The link patterns L11 to L22 may overlap the Rx lines R1 and R2 with an insulating layer interposed therebetween. The link patterns L11 to L22 may be formed of a metal with the high electrical conductivity, for example, aluminum (Al), aluminum neodymium (AlNd), molybdenum (Mo), chromium (Cr), copper (Cu), and silver (Ag), or a transparent conductive material. Other materials may be used.

The Rx lines R1 and R2 extend in a longitudinal direction (or a vertical direction) of the display panel 10, so that they are orthogonal to the Tx lines. The Rx lines R1 and R2 may be formed of a transparent conductive material, for example, indium tin oxide (ITO). Other materials may be used. Each of the Rx lines R1 and R2 may overlap the plurality of pixels (not shown). The Rx lines R1 and R2 may be formed on the upper substrate or the lower substrate of the display panel 10. For example, the transparent conductive patterns divided from the common electrode 2 may be used as Tx electrodes, and Rx electrodes may be formed on a front surface or a back surface of the upper substrate or the lower substrate of the display panel 10. In the in-cell type touch screen TSP shown in FIG. 3, the data lines of the pixel array may be used as the Rx electrodes, or the pixel array may include separate lines to be used as the Rx electrodes.

A common voltage source (not shown) supplies a common voltage Vcom to the Tx lines T11 to T23 and L11 to L22 during the display panel drive period T1. Thus, the Tx lines T11 to T23 and L11 to L22 operate as the common electrode 2 during the display panel drive period T1.

The touch sensing circuit 100 is connected to the Tx lines T11 to T23 and L11 to L22 and the Rx lines R1 and R2. The touch sensing circuit 100 is disabled during the display panel drive period T1 and is enabled during the touch screen drive period T2. Hence, only during the touch screen drive period T2, the touch sensing circuit 100 sequentially supplies the driving signal to the Tx lines T11 to T23 and L11 to L22 and receives the voltages of the mutual capacitances through the Rx lines R1 and R2. The driving signal swings between a driving voltage Vdry and a reference voltage Vref. In FIGS. 7 and 8, 'D1, D2, D3 . . . ' denote the data lines of the display panel 10, and 'G1, G2, G3 . . . ' denote the gate lines of the display panel 10.

The touch sensing circuit 100 samples the voltages of the mutual capacitances received through the Rx lines R1 and R2 and accumulates the sampled voltages to a capacitor of an integrator. The touch sensing circuit 100 converts a voltage charged to the capacitor of the integrator into digital data. The touch sensing circuit 100 compares the digital data with a previously determined threshold voltage and determines digital data equal to or greater than the threshold voltage as the mutual capacitance data of a touch (or proximity) input position.

Figure 9:
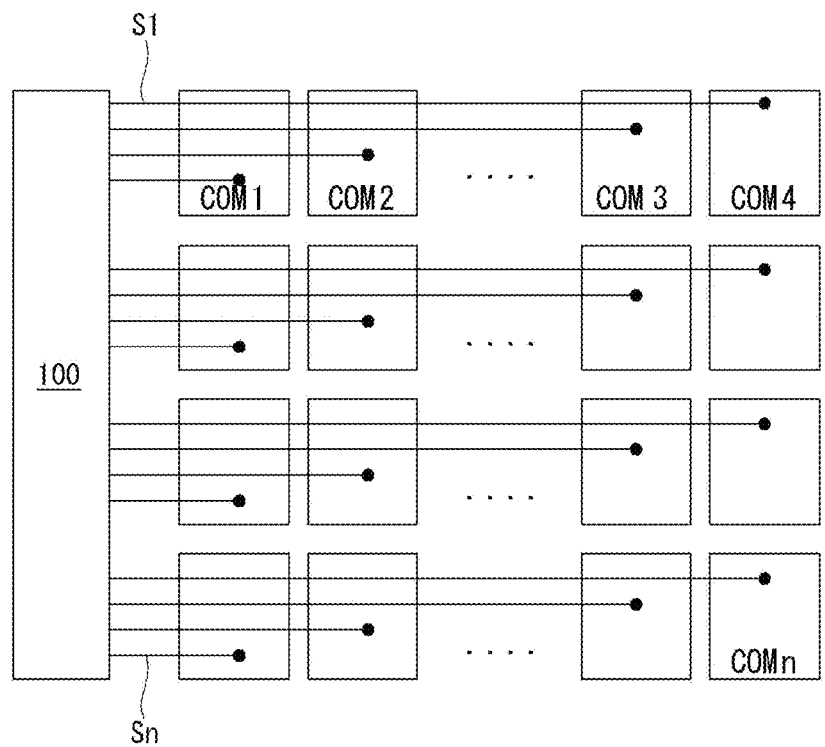
FIG. 9 is a plane view showing a line structure of a self-capacitive touch screen which is embedded in a display panel in an in-cell type.
Figure 10:
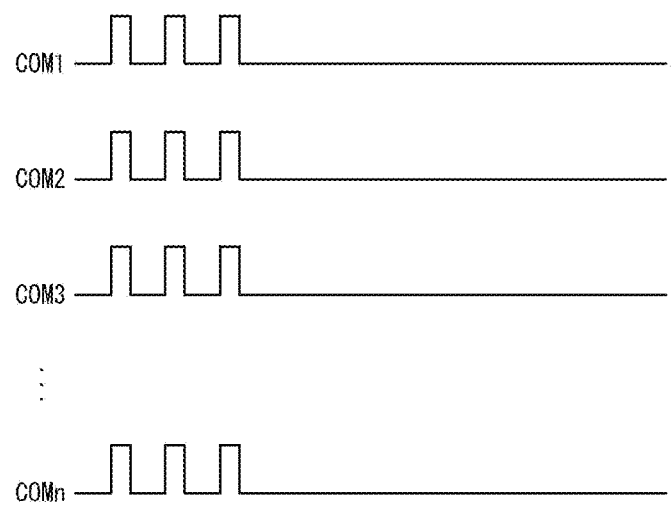
FIG. 10 is a waveform diagram showing an operation of a display device, in which the self-capacitive touch screen shown in FIG. 9 is embedded.

FIG. 9 is a plane view showing a line structure of a self-capacitive touch screen which is embedded in the display panel in the in-cell type. FIG. 10 is a waveform diagram showing an operation of the display device, in which the self-capacitive touch screen shown in FIG. 9 is embedded.

As shown in FIGS. 9 and 10, the self-capacitive touch screen TSP includes a plurality of transparent conductive patterns COM1 to COMn. Each of the transparent conductive patterns COM1 to COMn is patterned so that its size is greater than the size of pixels, and thus overlaps the plurality of pixels. The transparent conductive patterns COM1 to COMn may be formed of a transparent conductive material. Other materials may be used.

The touch sensing circuit 100 may be connected to the transparent conductive patterns COM1 to COMn through sensing lines S1 to Sn on a one-to-one basis. The common voltage source (not shown) supplies the common voltage Vcom to the transparent conductive patterns COM1 to COMn through the sensing lines S1 to Sn during the display panel drive period T1. Thus, the transparent conductive patterns COM1 to COMn operate as the common electrode during the display panel drive period T1.

The touch sensing circuit 100 is disabled during the display panel drive period T1 and is enabled during the touch screen drive period T2. The touch sensing circuit 100 simultaneously supplies the driving signal shown in FIG. 10 to the sensing lines S1 to Sn during the touch screen drive period T2. Although the display panel drive period T1 is not shown in FIG. 10, an operation of the display panel drive period T1 is substantially the same as FIG. 8.

Figure 11:
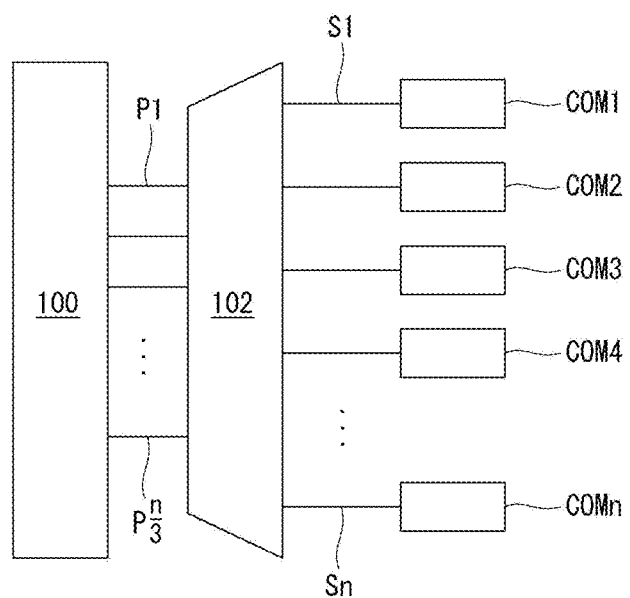
FIG. 11 illustrates a multiplexer installed between a touch sensing circuit and sensing lines in a self-capacitive touch screen.

As shown in FIG. 11, a multiplexer 102 may be installed between the touch sensing circuit 100 and the sensing lines S1 to Sn, so as to reduce the number of pins of the touch sensing circuit 100 in the self-capacitive touch screen TSP. When the multiplexer 102 is 1:N multiplexer, where N is a positive integer equal to or greater than 2 and less than n, n/N pins of the touch sensing circuit 100, to which the driving signal is output, are connected to output terminals of the multiplexer 102. The n output terminals of the multiplexer 102 are respectively connected to the transparent conductive patterns COM1 to COMn. The n transparent conductive patterns COM1 to COMn are divided into N groups and are time-division driven. Thus, the embodiment of the invention may reduce the number of pins of the touch sensing circuit 100 by 1/N using the multiplexer 102.

For example, in the case of the 1:3 multiplexer 102, the multiplexer 102 connects n/3 pins P1 to Pn/3 of the touch sensing circuit 100 to the transparent conductive patterns of a first group and simultaneously supplies the driving signal to the transparent conductive patterns of the first group. Subsequently, the multiplexer 102 connects the n/3 pins (P1 to Pn/3) to the transparent conductive patterns of a second group and simultaneously supplies the driving signal to the transparent conductive patterns of the second group. Subsequently, the multiplexer 102 connects the n/3 pins (P1 to Pn/3) to the transparent conductive patterns of a third group and simultaneously supplies the driving signal to the transparent conductive patterns of the third group. Thus, the touch sensing circuit 100 may supply the driving signal to the n transparent conductive patterns (COM1 to COMn) through the n/3 pins (P1 to Pn/3) using the multiplexer 102.

Figure 12:
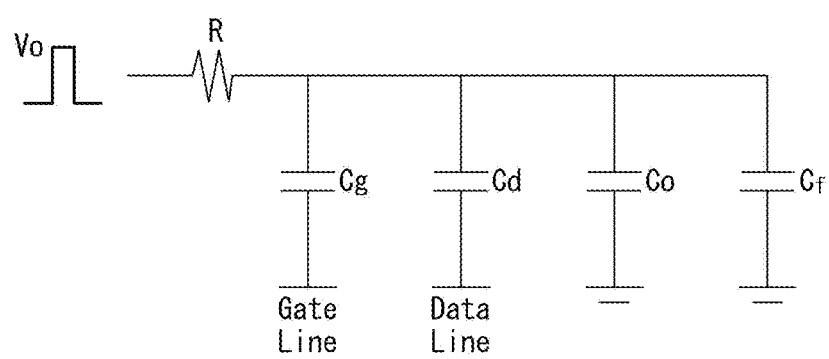
FIG. 12 is an equivalent circuit diagram of a self-capacitive touch screen.
Figure 13:
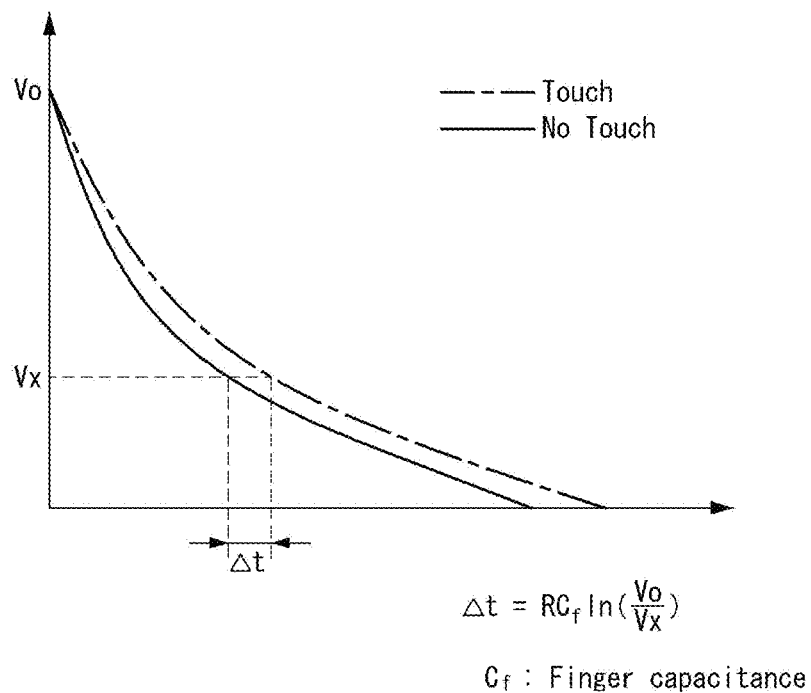
FIG. 13 is a waveform diagram showing a sensing principle of a touch input in a self-capacitive touch screen.

FIG. 12 is an equivalent circuit diagram of the self-capacitive touch screen. FIG. 13 is a waveform diagram showing the principle in which a touch input is sensed in the self-capacitive touch screen.

As shown in FIGS. 12 and 13, the self-capacitive touch screen TSP includes a resistor R and capacitors Cg, Cd, and Co. The resistor R includes a line resistance and a parasitic resistance of the self-capacitive touch screen TSP and the display panel 10. The capacitor Cg is positioned between the lines of the self-capacitive touch screen TSP and the gate lines 12, and the capacitor Cd is positioned between the lines of the self-capacitive touch screen TSP and the data lines 11. The capacitor Co is positioned between the lines of the self-capacitive touch screen TSP and other components of the display panel 10 except the data lines 11 and the gate lines 12.

When a driving signal Vo is applied to the lines of the self-capacitive touch screen TSP, a rising edge and a falling edge of the driving signal Vo are delayed by an RC delay value determined by the resistor R and the capacitors Cg, Cd, and Co shown in FIG. 12. When a user touches the self-capacitive touch screen TSP with a conductor or his or her finger, the capacitance of the self-capacitive touch screen TSP increases by 'Cf' shown in FIG. 12 and FIG. 13, and the RC delay further increases. For example, in FIG. 13, the solid line indicates the falling edge of the driving signal Vo when there is no touch input, and the dotted line indicates the falling edge of the driving signal Vo when the touch input is performed. The touch sensing circuit 100 compares a voltage of at least one of the rising edge and the falling edge of the driving signal Vo with a previously determined reference voltage Vx. The touch sensing circuit 100 counts a time required to reach the voltage of at least one of the rising edge and the falling edge of the driving signal Vo to the reference voltage Vx. Reference time information, which is required to reach the voltage of at least one of the rising edge and the falling edge of the driving signal Vo to the reference voltage Vx when there is no touch input, is previously stored in the touch sensing circuit 100. When a difference Δt between a time measured in real time by a counter and the previously known reference time information is equal to or greater than a previously determined threshold value, the touch sensing circuit 100 determines a current sensed self-capacitance as the touch (or proximity) input.

The gate low voltage VGL is applied to the gate lines 12 of the display panel 10 through the shift register 30 during the touch screen drive period T2.

Figure 14:
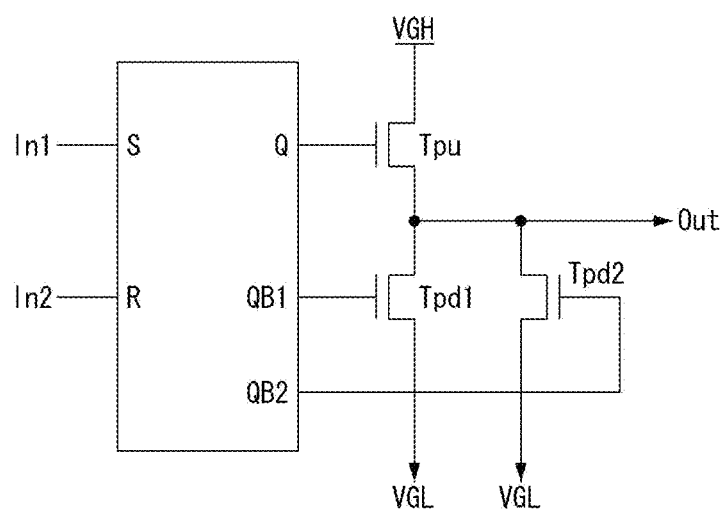
FIG. 14 is an equivalent circuit diagram showing the configuration of a first stage of a shift register according to a first embodiment of the invention.

The shift register 30 has a configuration in which a plurality of stages shown in FIG. 14 are cascade-connected. The stages include a flip-flop, a pull-up transistor Tpu, and pull-down transistors Tpd1 and Tpd2. A first output terminal Q of the flip-flop is connected to the pull-up transistor Tpu, and second and third output terminals QB1 and QB2 of the flip-flop are connected to the pull-down transistors Tpd1 and Tpd2.

When the clock signal CLK or an output of a previous stage is input (indicated by 'In1' in FIG. 14) to a first input terminal S of the flip-flop during the display panel drive period T1, a voltage of the first output terminal Q of the flip-flop increases, and the gate high voltage VGH is output to the gate lines 12. When the clock signal CLK or an output of a next stage is input (indicated by 'In2' in FIG. 14) to a second input terminal R of the flip-flop during the display panel drive period T1 and the touch screen drive period T2, voltages of the second and third output terminals QB1 and QB2 of the flip-flop increase, and the gate low voltage VGL is output to the gate lines 12.

Figure 15:
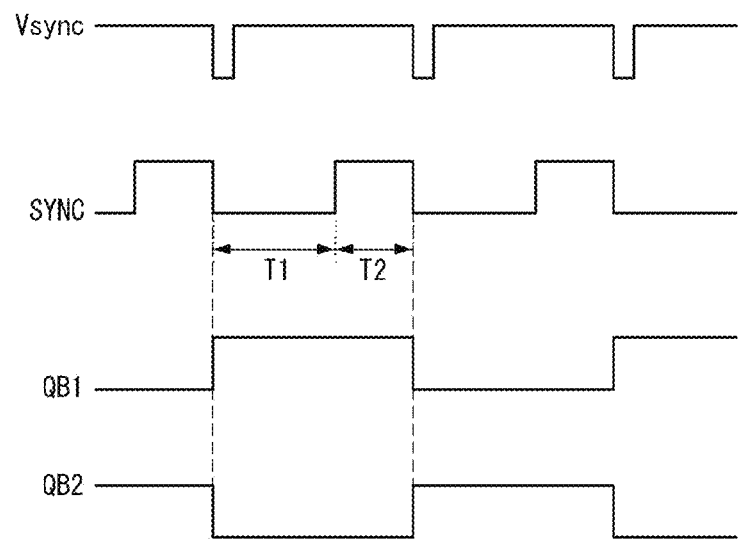
FIG. 15 is a waveform diagram showing an example of an AC drive of pull-down transistors shown in FIG. 14.

The gate low voltage VGL is supplied to the gate lines 12 for most of the time except the supply time of the gate pulse. Thus, the gate high voltage VGH, which is the DC voltage, is applied to gate electrodes of the first and second pull-down transistors Tpd1 and Tpd2 through the second and third output terminals QB1 and QB2 of the flip-flop for a long time. Thus, characteristics of threshold voltages of the first and second pull-down transistors Tpd1 and Tpd2 may change because of a gate bias stress. As shown in FIG. 15, the shift register 30 may supply the AC voltage to the second and third output terminals QB1 and QB2 of the flip-flop and may alternately drive the pull-down transistors Tpd1 and Tpd2, so as to compensate for the gate bias stress.

There may be a small difference between the pull-down transistors Tpd1 and Tpd2 in a parasitic capacitance, channel characteristics, etc. As shown in FIG. 15, when the pull-down transistors Tpd1 and Tpd2 are alternately driven during the touch screen drive period T2, changes in the parasitic capacitance of the capacitor Cg (refer to FIG. 12) connected to the gate line result from the small difference between the pull-down transistors Tpd1 and Tpd2, thereby increasing a noise of the sensing voltage. The embodiment of the invention uses a method for driving the pull-down transistors illustrated in FIG. 14 and FIGS. 16 to 19, so as to prevent the problem and enable the pull-down transistors Tpd1 and Tpd2 to perform the AC drive.

Figure 16:
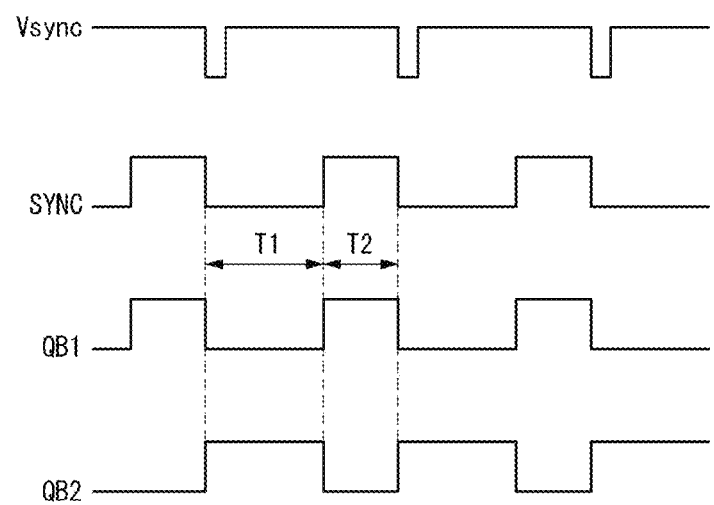
FIG. 16 illustrates a method for driving a pull-down transistor according to a first embodiment of the invention.

FIG. 16 illustrates a method for driving a pull-down transistor according to a first embodiment of the invention.

As shown in FIGS. 14 and 16, the method for driving the pull-down transistor according to the first embodiment of the invention drives only the second pull-down transistor Tpd2 during the display panel drive period T1 and drives only the first pull-down transistor Tpd1 during the touch screen drive period T2. The shift register 30 charges the third output terminal QB2 of the flip-flop to the voltage and turns on the second pull-down transistor Tpd2 during the display panel drive period T1. Subsequently, the shift register 30 charges the second output terminal QB1 of the flip-flop to the voltage and turns on the first pull-down transistor Tpd1 during the touch screen drive period T2.

As shown in FIGS. 14 and 16, the embodiment of the invention drives only the first pull-down transistor Tpd1 during the touch screen drive period T2 and holds the voltage of the gate line 12 at the gate low voltage VGL. Thus, the characteristics of the transistor connected to the gate line 12 do not change during the touch screen drive period T2. As a result, the embodiment of the invention may reduce the noise added to the sensing voltage because there is little change in the parasitic capacitance of the capacitor Cg (refer to FIG. 12) connected to the gate line 12 during the touch screen drive period T2.

Figure 17:
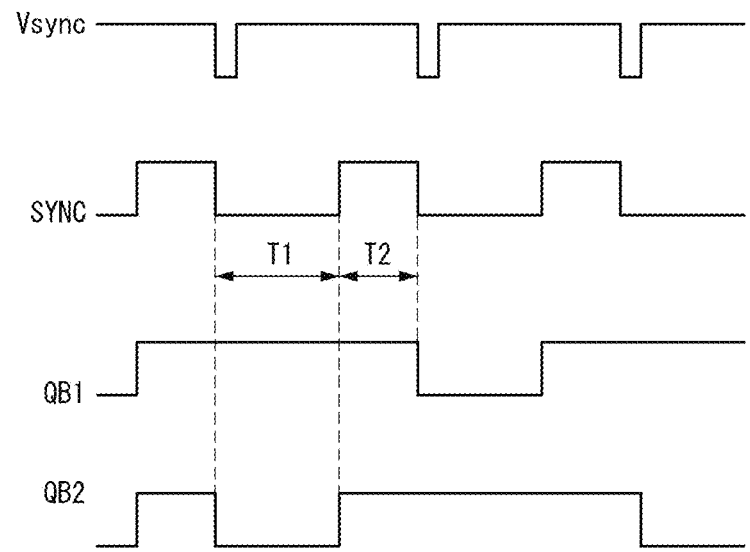
FIG. 17 illustrates a method for driving a pull-down transistor according to a second embodiment of the invention.

FIG. 17 illustrates a method for driving a pull-down transistor according to a second embodiment of the invention.

As shown in FIGS. 14 and 17, the method for driving the pull-down transistor according to the second embodiment of the invention simultaneously drives the first and second pull-down transistors Tpd1 and Tpd2 during the touch screen drive period T2. During the display panel drive period T1, the first and second pull-down transistors Tpd1 and Tpd2 are alternately driven. For example, the first pull-down transistor Tpd1 may be turned on during a display panel drive period T1 and a touch screen drive period T2 which are time-divided from a first frame period, and may be turned off during a display panel drive period T1 of a second frame period. The second pull-down transistor Tpd2 may be turned off during the display panel drive period T1 of the first frame period, and may be turned on during the display panel drive period T1 and a touch screen drive period T2 of the second frame period.

The shift register 30 charges the third output terminal QB2 of the flip-flop to the voltage and turns on the second pull-down transistor Tpd2 during the display panel drive period T1. Subsequently, the shift register 30 charges the second output terminal QB1 of the flip-flop to the voltage and turns on the first pull-down transistor Tpd1 during the touch screen drive period T2.

As shown in FIGS. 14 and 17, the embodiment of the invention simultaneously drives the first and second pull-down transistor2 Tpd1 and Tpd2 during the touch screen drive period T2 and holds the voltage of the gate line 12 at the gate low volt age VGL. Thus, the characteristics of the transistor connected to the gate line 12 do not change during the touch screen drive period T2. As a result, the embodiment of the invention may reduce the noise added to the sensing voltage because there is little changes in the parasitic capacitance of the capacitor Cg (refer to FIG. 12) connected to the gate line 12 during the touch screen drive period T2.

Figure 18:
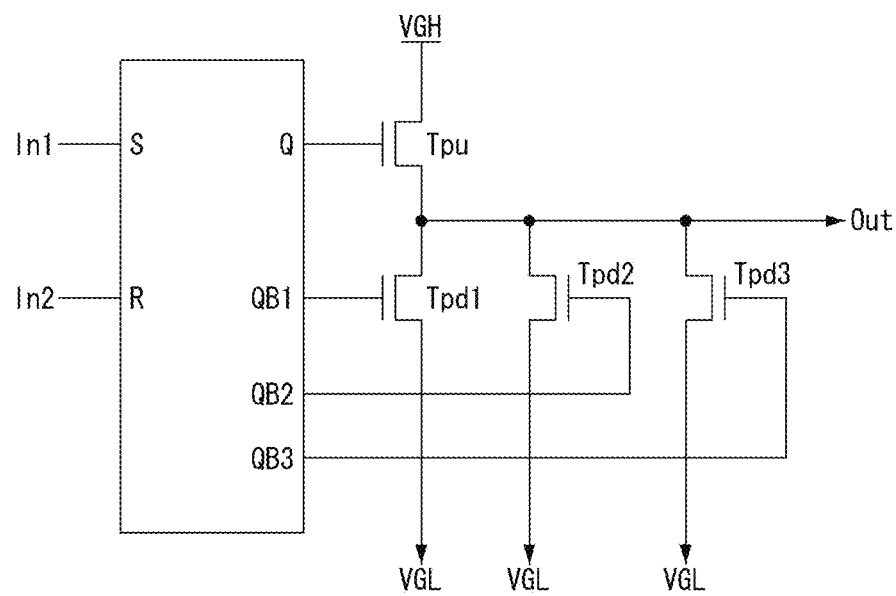
FIG. 18 is an equivalent circuit diagram showing configuration of a first stage of a shift register according to a second embodiment of the invention.
Figure 19:
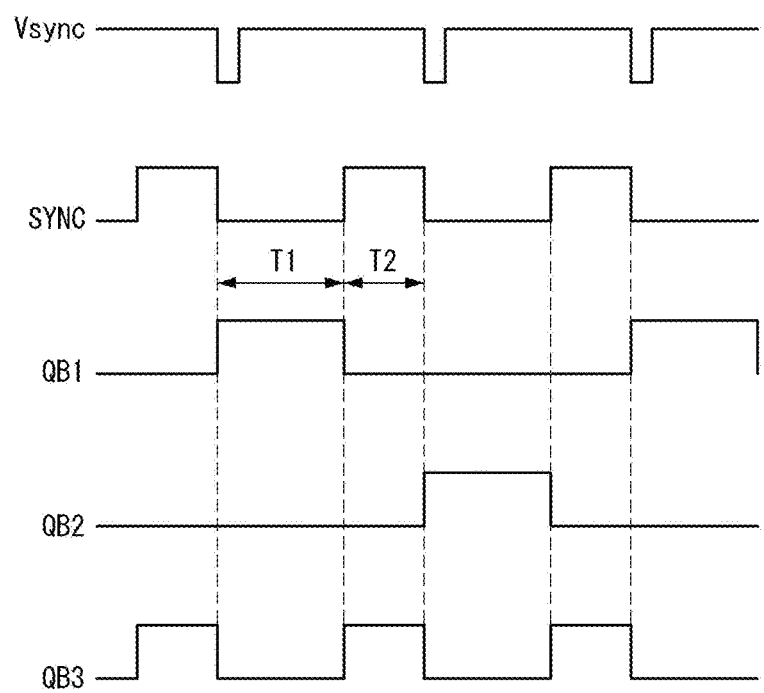
FIG. 19 illustrates a method for driving a pull-down transistor according to a third embodiment of the invention.

FIG. 18 is an equivalent circuit diagram showing the configuration of a first stage of the shift register according to the second embodiment of the invention. FIG. 19 illustrates a method for driving the pull-down transistor according to a third embodiment of the invention.

As shown in FIGS. 18 and 19, the shift register 30 has configuration in which a plurality of stages shown in FIG. 18 are cascade-connected. The stages include a flip-flop, a pull-up transistor Tpu, and pull-down transistors Tpd1 to Tpd3. A first output terminal Q of the flip-flop is connected to the pull-up transistor Tpu, and second to fourth output terminals QB1 to QB3 of the flip-flop are connected to the pull-down transistors Tpd1 to Tpd3.

When the clock signal CLK or an output of a previous stage is input (indicated by 'In1' in FIG. 18) to a first input terminal S of the flip-flop during the display panel drive period T1, a voltage of the first output terminal Q of the flip-flop increases. The pull-up transistor Tpu is turned on in response to the voltage of the first output terminal Q during the display panel drive period T1 and supplies the gate high voltage VGH to the gate lines 12. When the clock signal CLK or an output of a next stage is input (indicated by 'In2' in FIG. 18) to a second input terminal R of the flip-flop during the display panel drive period T1, voltages of the second and third output terminals QB1 and QB2 of the flip-flop alternately increase. The first and second pull-down transistors Tpd1 and Tpd2 are alternately turned on in response to the voltages of the second and third output terminals QB1 and QB2 during the display panel drive period T1, and the gate low voltage VGL is output to the gate lines 12. For example, the first pull-down transistor Tpd1 may be turned on during a display panel drive period T1 of a first frame period and may be turned off during a display panel drive period T1 of a second frame period. On the other hand, the second pull-down transistor Tpd2 may be turned off during the display panel drive period T1 of the first frame period and may be turned on during the display panel drive period T1 of the second frame period.

A voltage of the fourth output terminal QB3 of the flip-flop increases during the touch screen drive period T2. Thus, only the third pull-down transistor Tpd3 is turned on during the touch screen drive period T2. The third pull-down transistor Tpd3 is turned on in response to the voltage of the fourth output terminal QB3 during the touch screen drive period T2, and the gate low voltage VGL is output to the gate lines 12.

As shown in FIGS. 18 and 19, the embodiment of the invention drives only the third pull-down transistor Tpd3 during the touch screen drive period T2 and holds the voltage of the gate line 12 at the gate low voltage VGL. Thus, the characteristics of the transistor connected to the gate line 12 do not change during the touch screen drive period T2. As a result, the embodiment of the invention may reduce the noise added to the sensing voltage because there is little changes in the parasitic capacitance of the capacitor Cg (refer to FIG. 12) connected to the gate line 12 during the touch screen drive period T2.

The touch screen according to the embodiment of the invention is not limited to the in-cell type touch screen. For example, the method for driving the pull-down transistor illustrated in FIG. 14 and FIGS. 16 to 19 may be applied to the display device including the various types of touch screens shown in FIGS. 1 to 3.

As described above, the embodiment of the invention drives the pull-down transistors using the method, which does not change the characteristics of the pull-down transistors, so as to prevent an increase in the noise resulting from changes in the capacitance of the touch screen during the touch screen drive period. As a result, the embodiment of the invention may reduce the noise of the touch screen.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A driving device comprising:
    a driving circuit configured to:
        write data to pixels of a display panel during a display period of each frame period, and
        supply a touch drive signal to lines of a touch screen included in the display panel to sense a touch input on the touch screen during a touch sensing period adjacent within each frame period to the display period,
    wherein the driving circuit includes a plurality of pull-down transistors connected in parallel to one gate line to selectively supply a gate low voltage to the one gate line, and
    wherein the driving circuit changes a drive state of at least one of the plurality of pull-down transistors from an on state to an off state, or from the off state to the on state, between the display period and the adjacent touch sensing period within each frame period.

2. The driving device of claim 1, wherein the driving device comprises a controller configured to:
    generate a sync signal for controlling operation timings of a data driving circuit, a gate driving circuit, and a touch sensing circuit,
    time-divide each frame period into the display period and the adjacent touch sensing period, and
    wherein the data is not supplied to the pixels during the touch sensing period.

3. The driving device of claim 1, wherein the driving circuit comprises a gate driving circuit including:
    a level shifter configured to generate clock signals that swing between a gate high voltage and the gate low voltage,
    a shift register which is directly formed on a substrate of the display panel so that the shift register is connected to gate lines including the one gate line, shifts the clock signals, and sequentially supplies a gate pulse to the gate lines,
    wherein the pull-down transistors are connected to pull-down output terminals of the shift register, and
    wherein a pull-up transistor is connected to a pull-up output terminal of the shift register.

4. The driving device of claim 1,
    wherein the driving circuit comprises a gate driving circuit that includes first and second pull-down transistors which are connected in parallel to the one gate line and that supplies the gate low voltage to the one gate line when the first and second pull-down transistors are turned on, and
    wherein the gate driving circuit drives the first pull-down transistor during the display period of a first frame period and drives the second pull-down transistor during the display period of a second frame period.

5. The driving device of claim 1,
    wherein the driving circuit comprises a gate driving circuit that includes first and second pull-down transistors which are connected in parallel to the one gate line and that supplies the gate low voltage to the one gate line when the first and second pull-down transistors are turned on,
    wherein the gate driving circuit alternately drives the first and second pull-down transistors during the display period of each frame period, and wherein the gate driving circuit simultaneously drives the first and second pull-down transistors during the touch period of each frame period.

6. The driving device of claim 1,
wherein the driving circuit comprises a gate driving circuit that includes first to third pull-down transistors which are connected in parallel to the one gate line,
wherein the gate driving circuit supplies the gate low voltage to the one gate line when the first to third pull-down transistors are turned on, and
wherein the gate driving circuit alternately drives the first and second pull-down transistors during the display period of each frame period and drives the third pull-down transistor during the touch period of each frame period.

7. The driving device of claim 1, wherein the driving circuit turns on at least a same one of each of the plurality of pull-down transistors during the touch sensing period over each frame period.

8. A driving device comprising:
a driving circuit configured to:
write data to pixels of a display panel during a display period of each frame period, and
supply a touch drive signal to lines of a touch screen included in the display panel to sense a touch input on the touch screen during a touch sensing period adjacent within each frame period to the display period,
wherein the driving circuit includes a plurality of pull-down transistors connected in parallel to one gate line to selectively supply a gate low voltage to the one gate line,
wherein the driving circuit turns on at least a same one of the plurality of pull-down transistors during the touch sensing period over each frame period, and
wherein the driving circuit turns on a first pull-down transistor of the plurality during a first display period of a first frame period, and the driving circuit turns on a second pull-down transistor of the plurality during a second display period of a second frame period.

9. The driving device of claim 8, wherein the driving device comprises a controller configured to:
generate a sync signal for controlling operation timings of a data driving circuit, a gate driving circuit, and a touch sensing circuit,
time-divide each frame period into the display period and the adjacent touch sensing period, and
wherein the data is not supplied to the pixels during the touch sensing period.

10. The driving device of claim 8, wherein the driving circuit comprises a gate driving circuit including:

a level shifter configured to generate clock signals that swing between a gate high voltage and the gate low voltage,
a shift register which is directly formed on a substrate of the display panel so that the shift register is connected to gate lines including the one gate line, shifts the clock signals, and sequentially supplies a gate pulse to the gate lines,
wherein the pull-down transistors are connected to pull-down output terminals of the shift register, and
wherein a pull-up transistor is connected to a pull-up output terminal of the shift register.

11. The driving device of claim 8,
wherein the driving circuit comprises a gate driving circuit that includes the first and second pull-down transistors and that supplies the gate low voltage to the one gate line when the first and second pull-down transistors are turned on, and
wherein the gate driving circuit drives the first pull-down transistor during the first display period of the first frame period and drives the second pull-down transistor during the second display period of the second frame period.

12. The driving device of claim 8,
wherein the driving circuit comprises a gate driving circuit that includes the first and second pull-down transistors and that supplies the gate low voltage to the one gate line when the first and second pull-down transistors are turned on,
wherein the gate driving circuit alternately drives the first and second pull-down transistors during the display period of each frame period, and
wherein the gate driving circuit simultaneously drives the first and second pull-down transistors during the touch period of each frame period.

13. The driving device of claim 8,
wherein the driving circuit comprises a gate driving circuit that includes the first and the second pull-down transistors and a third pull-down transistor connected in parallel to the one gate line,
wherein the gate driving circuit supplies the gate low voltage to the one gate line when the first to third pull-down transistors are turned on, and
wherein the gate driving circuit alternately drives the first and second pull-down transistors during the display period of each frame period and drives the third pull-down transistor during the touch period of each frame period.

* * * * *